Figure 1:
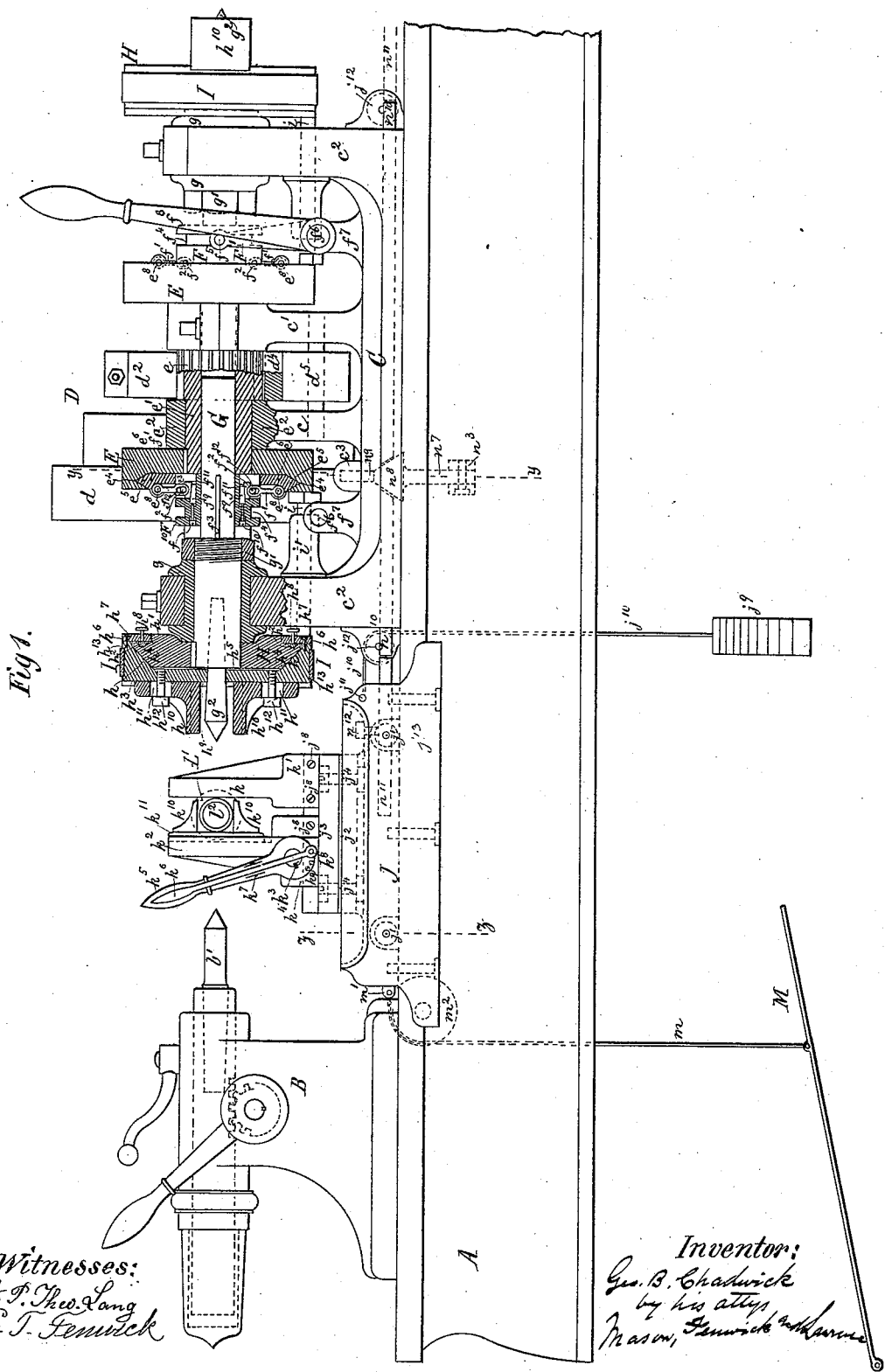

(No Model.) 3 Sheets—Sheet 1.

G. B. CHADWICK.
MACHINE FOR GRINDING COCKS AUTOMATICALLY.

No. 430,142. Patented June 17, 1890.

Witnesses:
J. P. Theo. Lang
E. T. Fenwick

Inventor:
Geo. B. Chadwick
by his attys
Mason, Fenwick & Lawrence

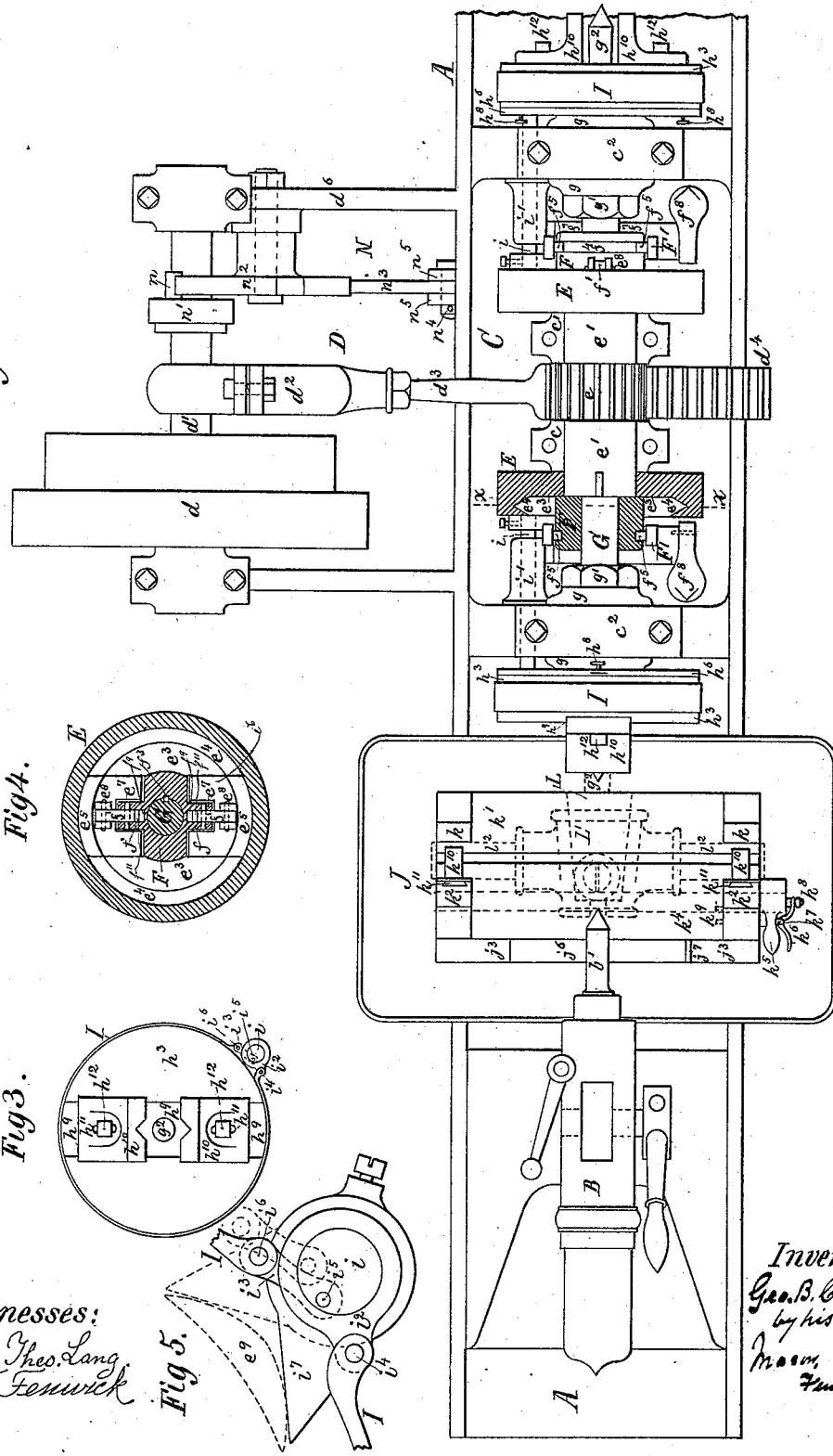

(No Model.) 3 Sheets—Sheet 3.
G. B. CHADWICK.
MACHINE FOR GRINDING COCKS AUTOMATICALLY.
No. 430,142. Patented June 17, 1890.
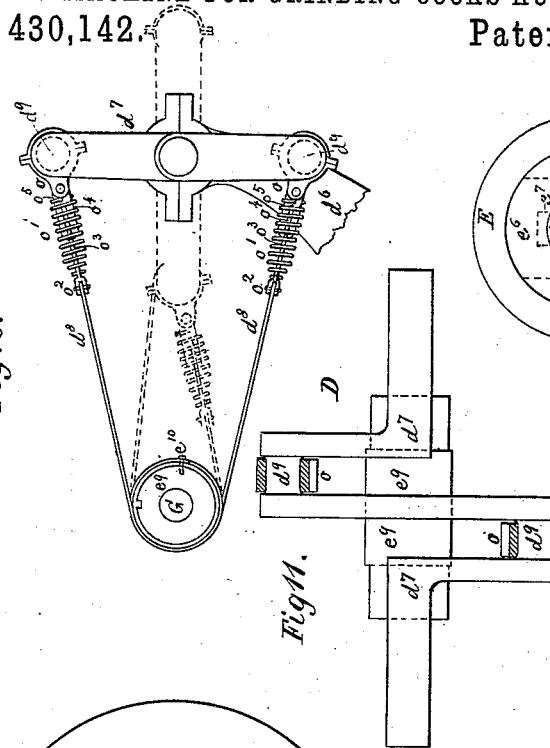
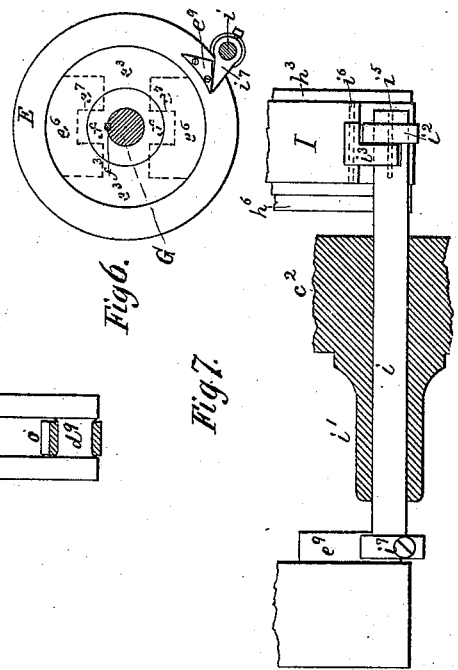
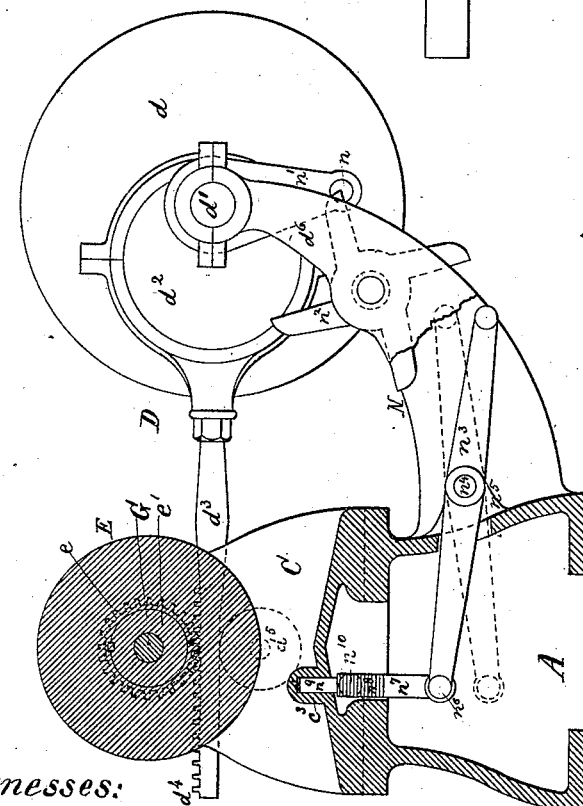
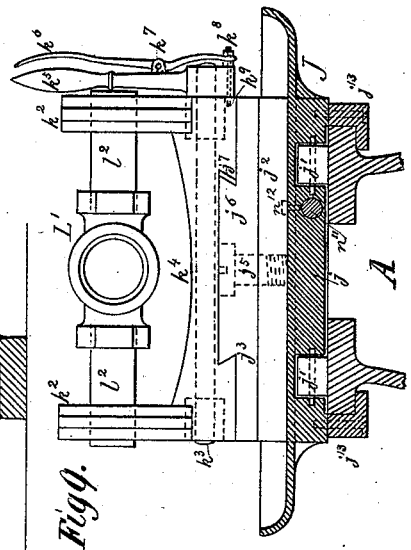
Witnesses:
J. P. Theo. Lang.
E. T. Fenwick
Inventor:
Geo. B. Chadwick
by his Attys
Mason, Fenwick & Lawrence

UNITED STATES PATENT OFFICE.

GEORGE B. CHADWICK, OF PORTSMOUTH, NEW HAMPSHIRE.

MACHINE FOR GRINDING COCKS AUTOMATICALLY.

SPECIFICATION forming part of Letters Patent No. 430,142, dated June 17, 1890.

Application filed May 6, 1889. Serial No. 309,753. (No model.)

*To all whom it may concern:*

Be it known that I, GEORGE B. CHADWICK, a citizen of the United States, residing at Portsmouth, in the county of Rockingham and State of New Hampshire, have invented certain new and useful Improvements in Machines for Grinding Cocks; and I do hereby declare the following to be a full, clear, and exact description of the invention, such as will enable others skilled in the art to which it appertains to make and use the same.

My invention relates to a machine for grinding cocks; and it consists in certain peculiarities of construction, and in novel combinations of devices and arrangements thereof, which will be hereinafter fully described and specifically claimed, whereby the plug and shell of a cock are ground simultaneously in substantially the same manner as has heretofore been done by hand.

In the accompanying drawings, Figure 1 is a front elevation of my invention and illustrating a portion of a duplex cock-grinding machine, parts thereof being represented in section and the remainder in elevation. Fig. 2 is a top view of the same. Fig. 3 is a view of a disk containing the plug-clamps and center for rotating the plug. Fig. 4 is a vertical section in the line $x\ x$ of Fig. 2. Fig. 5 is an enlarged broken view of a brake mechanism shown in Fig. 3. Fig. 6 is a face view of a disk operating the said brake mechanism, the shafts of moving parts being shown in cross-section. Fig. 7 is an enlarged broken view of said brake mechanism, the support for the shafts being shown in longitudinal section. Fig. 8 is a vertical section in the line $y\ y$ of Fig. 1. Fig. 9 is a vertical section in the line $z\ z$ of Fig. 1, and Figs. 10 and 11 are views of a modified construction of the rotating mechanism.

The letter A in the drawings represents an ordinary lathe-bed; B, tail-stock of the same; C, lathe-head, and D the rotating and feeding mechanism.

The rotating mechanism consists of an ordinary cone-pulley $d$ on a main shaft $d'$, an eccentric $d^2$, and an eccentric-rod $d^3$, provided with a rack $d^4$, which rests upon a guide-roller $d^5$, suitably hung between two bearing-standards $c\ c'$ of the lathe-head C. The rack $d^4$ gears into a pinion $e$ on a sleeve $e'$, which latter is hung in suitable bearings $e^2$ of the standards $c\ c'$. To the ends of the sleeve $e'$, outside the bearings $e^2$, disks E are fastened. Both disks being of the same construction, it will suffice to describe one of them. The face portion of disk E has a concentric depression $e^3$, with a V-shaped inner groove or circumference $e^4$. Into said circumference $e^4$ the head portions $e^5$ of two segmental sliding friction-blocks $e^6$ are fitted, the blocks being provided with diametrical slots $e^7$, fitted to corresponding parallel reductions $f$ of a sliding collar F, whereby said blocks $e^6$ are permitted to move diametrically upon the collar and revolve with the collar. The blocks $e^6$ can be forced outward into the V-shaped groove $e^4$ by means of links $f'$, which are pivoted at $e^8$ to the said blocks and at $f^2$ to the collar F. The collar F is secured, by means of a spline $f^3$, to a spindle G, and can be moved along the same by means of an annular groove $f^4$ and a forked lever F', having pins $f^5$ located in said groove. The fulcrum-shaft $f^6$ of the lever F' is hung in a standard $f^7$ of the lathe-head, and is provided at its front end with a hand-lever $f^8$. The links $f'$ are adjusted and held in place by means of wedges $f^9$, which are secured in the collar F, and adjusted by means of set-screws $f^{10}$. The links $f'$ are preferably protected against wear upon the wedges $f^9$ by interposed wearing-plates $f^{11}$, which are made to fit the end portions of the links, and the links are slotted at $f^{12}$ in order to compensate for the wear in the described brake mechanism. The tail portion of the spindle G is fitted about half-way into the sleeve $e'$, in which it turns freely. The head portion of said spindle is supported by a bearing $g$ in a standard $c^2$ of the lathe-head C, and is beyond said bearing provided with a disk H. This disk bears against one end of the bearing $g$, while an adjustable nut $g'$ on the shaft G bears against the other end of said bearing, thus holding the shaft steady in a longitudinal direction. The disk H has a conical circumference $h$ and an annular V-shaped gutter $h'$ in its rear side, into which a similarly-shaped ring $h^2$ is placed, a disk $h^3$, with an inner conical surface $h^4$, fitting the conical circumference $h$ of disk H to such a degree as to keep the plain body portions of the said disks at some distance apart, as shown at $h^5$, in order to compensate for wear of the conical surfaces. This disk $h^3$ is provided with a ring $h^6$, secured to it by means of screws $h^7$ or otherwise, and bearing upon the rear surface of the disk H. The ring $h^6$ is provided with thumb-screws $h^8$, which bear by way of adjustment upon the ring $h^2$ with more or less force, and thus the two disks are caused to work with more or less friction at their conical joint. The face of the disk $h^3$ is provided with a diametrical depression $h^9$, which serves as a guide for two adjustable jaws $h^{10}$, rendered adjustable by means of slots $h^{11}$ and set-screws $h^{12}$. A lathe-center $g^2$ is fitted into the spindle G and extends between the jaws $h^{10}$, so that the square or flat head of a cock-plug L can be inserted between said jaws and secured upon the lathe-center. The disk $h^3$ is provided with an annular gutter $h^{13}$, into which a brake-band I is placed, and in rear of the disk H and in line with its axis a shaft $i$ is hung in a bearing $i'$ on the standard $c^2$. This shaft $i$ is connected with the ends of the brake-band I by means of links $i^2$ $i^3$, as shown in Figs. 5 and 7, the link $i^2$ being loosely fitted upon the shaft $i$ and connected by a pin $i^4$ to the brake-band, and the link $i^3$ being connected to the shaft $i$ by means of an eccentric-pin $i^5$ and to the brake-band by means of a pin $i^6$. By this construction the end portion of the brake-band held by link $i^2$ is rendered stationary, while the other end portion may be drawn tight or let loose by the action of the eccentric-pin $i^5$. This action is caused by the oscillation of the shaft $i$, which by means of a lever-toe $i^7$ on its other end portion standing in range of a fixed lug $e^9$ on the disk E, is turned for a short portion of each revolution of the disk E, and thus temporarily draws the brake-band I tight around the disk $h^3$ and stops its motion. I have found that by stopping the disk $h^3$ during one-twelfth revolution, or thereabout, good results are achieved. By this arrangement the forward revolutions of the disk $h^3$ and of the cock-plug are shortened, while the backward revolutions are undiminished and the starting-point of each forward revolution is changed every time. Opposite the lathe-head C the tail-stock B is placed, the function of which is to hold, by means of lathe-center $b'$, the screw end of the cock-plug L. This tail-stock may be of any known construction and does not require any description.

Between the lathe-head and tail-stock a slide-rest or carriage J is fitted to the lathe-bed A and held thereon by angular guides $j^{13}$, as shown in Fig. 9, and in order to make it yield easily to the lower or main portion $j$ it is provided with rollers $j'$, which support the weight of the carriage and relieve it of the greater part of its friction along the lathe-bed. This main portion $j$ is shaped like a trough with a central support $j^2$ for an ordinary slide-rest $j^3$, which is fastened to it by means of bolts $j^4$, or in lieu thereof with one center bolt $j^5$. The latter construction allows the slide-rest to swing horizontally. The slide-rest is provided with two upright jaws $k$, united to a transverse sliding plate $k'$, and two swinging jaws $k^2$, united to a rock-shaft $k^3$, which is seated or socketed in a sliding plate $k^4$, and is provided with a hand-lever $k^5$. The hand-lever $k^5$ is provided with a locking-lever $k^6$, pivoted to the same at $k^7$, and having a locking-pin $k^8$ at its lower end, which penetrates the hub of the hand-lever and occupies one of a number of holes $k^9$ in the plate $k^4$. The jaws $k^2$ are provided with horizontal jaws $k^{10}$, between which the gas-pipes $l^2$, which are secured into the cock-shell $L'$, are held. These jaws are united to dove-tailed plates $k^{11}$, which are fitted into similarly-formed depressions in the jaws $k^2$. I make a series of jaws $k^{10}$ with different-sized openings or with members spaced at different distances apart in order to suit cocks of different sizes, and by means of the described construction they are easily interchangeable. The sliding plates $k'$ $k^4$ are fitted upon the dovetailed top portion $j^6$ of the slide-rest $j^3$, and can by means of a gib $j^7$ and set-screws $j^8$ be adjusted and fastened at any desirable distance from each other in order to suit the requirements for grinding differently-sized cocks.

The carriage J is pulled toward the lathe-head C by means of an adjustable multiple weight $j^9$ and a cord or chain $j^{10}$, the latter being fastened to the carriage $j^{11}$ and suspended over a pulley $j^{12}$, hung to the lathe-head, as shown in Fig. 1. Another chain or cord $m$ is fastened at $m'$ to the carriage J, passed over a pulley $m^2$, which is hung to the tail-stock, as shown by dotted lines in Fig. 1, and fastened to a treadle M. By putting his foot on this treadle and moving it down the operator can move the carriage J away from the lathe-head whenever he finds it necessary to instantly stop the grinding operation. The carriage J is operated by a reciprocating mechanism N, receiving its motion from the counter-shaft $d'$ by means of an eccentric pin or roller $n$ upon a crank $n'$ on said counter-shaft. The roller $n$ rotates a star-wheel $n^2$, hung to one of the arms $d^6$, on which the counter-shaft $d'$ is hung. The star-wheel $n^2$ engages a lever $n^3$, hung at $n^4$ on lugs $n^5$ of the lathe-bed. Pivoted at $n^6$ on the lever $n^3$ is a rod $n^7$, with a tapered head $n^8$ and a cylindrical guide-extension $n^9$. The extension $n^9$ moves and is guided in a socket $c^3$ of the lathe-head C, and thus holds the rod $n^7$ in upright position. The tapered head $n^8$ bears against the ends of two rods $n^{10}$, fitted into the lower portion of the lathe-head, and each abutting against a rod $n^{11}$, (when a duplex machine is adopted,) fitted into the carriage J and adjusted and fastened in place, respectively, by means of a set-screw $n^{12}$, as seen in Fig. 1. When the rod $n^7$ rises, the rod $n^{10}$ moves the carriage J toward the tail-stock B and raises the weight $j^9$, which latter moves the carriage back toward the lathe-head, when the rod $n^7$ descends.

In the drawings my invention is represented as used in a duplex machine, the parts to the right and left of the pinion $e$ being symmetrical and of the same construction, and although I prefer said construction, because it possesses the advantage over a single machine of doing with one attendant in a given time twice the amount of work of a single machine, I regard the principle the same, whether the invention be used on a single or duplex organization.

The modified construction of the rotating mechanism shown in Figs. 10 and 11 will be used for small work, which necessitates quicker motion of the machine than could be safely produced by the described rack $d^4$ and pinion $e$. In this construction the plain shaft $d'$, eccentric $d^2$, and rack $d^4$ are replaced by a double-crank shaft $d^7$ and two expansible connecting-straps $d^8$, and the pinion $e$ has substituted for it a pulley $e^9$. The crank-pins $d^9$ of the said crank-shaft are provided with clasps $o$, to which springs $o'$ are attached, which hold clasps $o^2$, to which the straps $d^8$ are fastened. The clasps $o^2$ are provided with looped shanks $o^3$, which are held in slots $o^4$ of links $o^5$, pivoted to the clasps $o$. The straps $d^8$ are fastened to the pulley $e^9$ by means of set-screws $e^{10}$ or otherwise. When the crank-shaft $d^7$ is in the position shown in Fig. 10, the united distances of the pulley $e^9$ and crank-pins $d^9$ are greater than when the crank-pins and pulley are in line with each other, and in that case the springs $o'$ will be extended to compensate for the said difference.

In order to prepare a cock for grinding, the machine is stopped, the cock-shell $L'$, provided with the gas-pipes $l^2$ and plug $L$, is inserted into the jaws $k^{10}$, which are swung away from the jaws $k$ for that purpose. The hand-lever $k^5$ is then turned toward the lathe-head, whereby the jaws are caused to approach the gas-pipes $l^2$ and grip them. The plug $L$ is then inserted between the jaws $k^{10}$, righted between the centers $l\ l'$ and secured between them, as shown in Fig. 2. The plug $L$ is then wet and covered with sand, and the machine is set in motion and the plug rapidly revolved forward and backward within the cock-shell, making about eleven-twelfths of a revolution forward and a whole revolution backward, so that at the beginning of every forward revolution the plug occupies a different position in its shell, thereby producing spiral and rotary motions of the sand, insuring its passage universally and uniformly between the cock and shell, and avoiding the cutting of ring-channels in the surfaces, thus avoiding imperfect grinding or overgrinding on one side of the shell, which would otherwise be caused by an undue accumulation of sand on one side of the plug. While the plug is thus moved around its axis the shell $L'$ is reciprocated along its axis by the above-described rise and fall of the rod $n^7$ and the gravitation of the weight $j^9$, which latter moves the plug into its shell with more or less force, according to previous adjustment, against the plug $L$ and causes more or less rapid grinding, as circumstances may require. If from any cause the plug should jam in the shell and its revolution become very difficult, the disk $h^3$ will be stopped thereby and the disk $H$ will continue to revolve, whereupon the operator moves down the treadle $M$ with his foot, while, by means of the hand-lever $f^8$, he moves the collar $F$ away from the disk $E$, thus reducing the friction of the blocks $e^6$ and stopping the motion of the spindle $G$. If it is found that the jamming is caused by a perfect fit between the plug and its shell, the cock is removed and another inserted in its place. For light work less weight at $j^9$ will be employed, and for heavier work a greater weight will be used. When there is less resistance to the revolution of the plug, the thumb-screws $h^8$ should be secured with less force upon the ring $h^2$, so as to reduce the friction between the disks $H$ and $h^3$. This construction enables the operator to so adjust the friction of the two disks $H\ h^3$ that he can determine by the sense of feeling, while holding the hand-lever $f^8$, when it is necessary to bear with more or less force upon the same in order to properly speed the grinding operation and at the same time avoid the above-mentioned jamming. While the shell $L'$ is being moved from the disks $H\ h^3$ and the plug $L$ exposed the operator puts on a new supply of sand and water, this being repeated until a cock with a perfectly-ground joint is produced. During the removal of the finished cock and the introduction of another to be ground the operator may in his judgment allow the disk $H$ to continue its motions; but he should prevent it from moving the spindle $G$ by keeping the collar $F$ away from said disk. It will be seen that when the invention is applied so as to make a duplex machine a single attendant can grind two cocks simultaneously without change of manipulation.

In my machine the operation of grinding by hand is reproduced in all its details—to wit, forward and backward revolution with gain in or change of starting-point, longitudinal movement, stopping of revolution under undue resistance of the plug, and stoppage of the grinding operation by the treadle at any desired moment, and the advantage of performing these operations by machinery is that of greater rapidity of operation, which from experience has proved to be about four times that of a skilled man doing the work by hand.

What I claim as my invention is—

1. In a cock-grinding machine, means, substantially as described, for producing upon the plug of the cock alternately-reversed long and short rotary motions and an intermediate rest at the end of each short rotary motion, substantially as described.

2. In a cock-grinding machine, means, substantially as described, for producing upon the cock-plug forward and backward revolutions with a gain and stoppage of motion during such gain, and means, as described, for giving a reciprocating axial motion to the cock-shell, whereby spiral and rotary motions are alternately imparted to the sand between the cock-plug and the shell, thus preventing the sand from cutting and scratching the matching surfaces during the operation of grinding, substantially as described.

3. In a cock-grinding machine, means, substantially as described, for producing upon the plug of the cock alternately-reversed rotary motions, a progressive gain on said motions caused by a periodical automatic slip between the lathe-spindle and plug-clamp, and automatic means for stopping the rotary motion of the plug under and by undue resistance of the plug to the grinding operation, substantially as described.

4. A cock-grinding machine comprising, in combination, means for producing upon the cock-plug alternately-reversed rotary motion, periodical progressive gain, and periodical rest, means for automatically stopping the motion of the plug when overcome by undue resistance, and means for stopping the motion of the plug at pleasure by foot-pressure, substantially as described.

5. In a cock-grinding machine, the combination of a lathe-head and plug-clamp having an alternately-reversed rotary motion with periodical stops and gains, with a plug-supporting tail-stock and a shell-supporting carriage having an automatic reciprocating motion, and a stop-relief mechanism worked by foot-power, substantially as described.

6. In a cock-grinding machine, in combination, a reciprocating rack, a pinion geared with the same and provided with a hand-operated friction-coupling, and a lathe-spindle and clamp-disk moved by said friction-coupling, the combination being such that the cock-plug can be instantly stopped while the motive power continues, substantially as described.

7. In a cock-grinding machine, in combination, the spindle G, having disk H, the clamp-disk $h^3$, provided with cone-surfaces $h\ h^4$, ring $h^6$, thumb-screw $h^8$, and V-shaped friction-ring $h^2$, substantially as described.

8. In a cock-grinding machine, in combination, the disk E, having V-shaped inner groove $e^4$, in combination with the sleeve $e'$, the diametrically-sliding blocks $e^6$, having V-shaped head portions $e^5$, links $f'$, sliding collar F, spindle G, having disk H, and clamp-disk $h^3$, substantially as described.

9. In a cock-grinding machine, in combination, the reciprocating clamp-carriage J, having stationary jaws $k$ and swinging adjustable clamps $k^2\ k^{10}$, shaft $k^3$, hand-lever $k^5$, and locking-lever $k^6$, substantially as described.

10. In a cock-grinding machine, in combination, the reciprocating cock-shell clamping-carriage J, adjustable weight $j^9$, chain $j^{10}$, horizontally-reciprocating rod $n^{10}$, and the vertically-reciprocating rod $n^7$, having tapered head $n^8$, substantially as described.

11. In a cock-grinding machine, in combination, the reciprocating clamp-carriage J, the feed mechanism N, the weight $j^9$, rod $n^{10}$, and the adjustable abutting rod $n^{11}$, substantially as described.

12. In a cock-grinding machine, the combination, with the back and forward revolving cock-plug L, of a cock-shell L', a reciprocating clamp-carriage J, and the relief-treadle M and cord $m$, substantially as described.

13. In a cock-grinding machine, in combination, the main shaft $d'$, crank $n'$, crank-pin $n$, star-wheel $n^2$, lever $n^3$, rod $n^7$, having tapered head $n^8$, rods $n^{10}$, and clamp-carriage J, substantially as described.

14. In a cock-grinding machine, in combination, the friction-coupling E F, lug $e^9$, disk H, spindle G, clamp-disk $h^3$, brake-band I, shaft $i$, having lever-toe $i^7$, links $i^2\ i^3$, and eccentric-pin $i^5$, substantially as described.

In testimony whereof I hereunto affix my signature in presence of two witnesses.

GEORGE B. CHADWICK.

Witnesses:
ABBE CHADWICK,
PERSIS L. BUFFORD.